United States Patent
Lieberman et al.

(10) Patent No.: US 10,095,489 B1
(45) Date of Patent: Oct. 9, 2018

(54) GUI-BASED APPLICATION TEMPLATE FOR CONTAINERIZED APPLICATION SOFTWARE DEVELOPMENT

(71) Applicant: EMC IP Holding Company LLC, Hopkinton, MA (US)

(72) Inventors: Amit Lieberman, Kfar Saba (IL); Assaf Natanzon, Tel Aviv (IL); Jehuda Shemer, Kfar Saba (IL); Kfir Wolfson, Beer Sheva (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/388,559

(22) Filed: Dec. 22, 2016

(51) Int. Cl.
    *G06F 9/44* (2018.01)
    *G06F 8/36* (2018.01)
    *G06F 8/35* (2018.01)

(52) U.S. Cl.
    CPC . *G06F 8/36* (2013.01); *G06F 8/35* (2013.01)

(58) Field of Classification Search
    CPC ........................................................ G06F 8/36
    USPC .................... 717/101–103, 120–123, 109
    See application file for complete search history.

(56) References Cited

U.S. PATENT DOCUMENTS

| | | | | |
|---|---|---|---|---|
| 7,065,740 B2 * | 6/2006 | Westerinen | ....... | G06F 17/30286 707/E17.005 |
| 7,103,873 B2 * | 9/2006 | Tanner | ............ | G06F 9/451 717/109 |
| 7,340,714 B2 * | 3/2008 | Upton | ............ | G06F 9/541 717/102 |
| 7,370,315 B1 * | 5/2008 | Lovell | ............ | G06F 8/33 715/763 |
| 7,735,062 B2 * | 6/2010 | de Seabra E Melo | ............ | G06F 9/451 717/120 |
| 7,779,389 B2 * | 8/2010 | Markov | ............ | G06F 9/44505 717/120 |
| 7,873,940 B2 * | 1/2011 | Sanghvi | ............ | G06Q 10/06 717/102 |
| 7,917,888 B2 * | 3/2011 | Chong | ............ | G06F 8/20 717/102 |
| 8,171,470 B2 * | 5/2012 | Goldman | ............ | G06F 8/61 717/120 |
| 8,176,466 B2 * | 5/2012 | Tristram | ............ | G06F 8/36 717/105 |
| 8,291,378 B2 * | 10/2012 | Arnold | ............ | G06F 8/61 717/104 |
| 8,370,803 B1 * | 2/2013 | Holler | ............ | G06F 8/36 717/101 |
| 8,429,203 B2 * | 4/2013 | Perez | ............ | G06F 8/34 707/804 |

(Continued)

OTHER PUBLICATIONS

Gandhi et al, "Estimation of Generic Reusability for Object-Oriented Software an Empirical Approach", ACM, pp. 1-4, 2011.*

(Continued)

*Primary Examiner* — Anil Khatri
(74) *Attorney, Agent, or Firm* — Staniford Tomita LLP (57) ABSTRACT

Embodiments are directed to a graphical user interface-driven store and share system containing application templates that defines a database storing components and services of an application, exposes the application elements to different users in the system, and provides a uniform entry point for the different users to access and manipulate the application program components.

19 Claims, 7 Drawing Sheets

(56) References Cited

U.S. PATENT DOCUMENTS

| | | | | |
|---|---|---|---|---|
| 8,527,943 B1* | 9/2013 | Chiluvuri | ............... | G06F 8/36 |
| | | | | 717/106 |
| 8,584,079 B2* | 11/2013 | Yassin | ............... | G06F 11/3672 |
| | | | | 717/101 |
| 8,776,011 B2* | 7/2014 | Sharma | ............... | G06F 8/34 |
| | | | | 717/101 |
| 8,843,889 B2* | 9/2014 | Anderson | ............... | G06F 8/70 |
| | | | | 717/120 |
| 8,966,434 B2* | 2/2015 | Perisic | ............... | G06F 8/71 |
| | | | | 717/102 |
| 9,043,747 B2* | 5/2015 | Eksten | ............... | G06F 8/70 |
| | | | | 709/219 |
| 9,218,166 B2* | 12/2015 | Ramanathan | ............... | G06F 8/36 |

OTHER PUBLICATIONS

Riaz et al, "Using Templates to Elicit Implied Security Requirements from Functional Requirements ☐ A Controlled Experiment", ACM, pp. 1-10, 2014.*

Parr, "Web Application Internationalization and Localization in Action", ACM, pp. 64-70, 2006.*

Ristic et al, "An Approach to the Specification of User Interface Templates for Business Applications", ACM, pp. 124-129, 2012.*

AliMohammadzadeh et al, "Template Guided Association Rule Mining from XML Documents", ACM, pp. 963-964, 2006.*

Raulet et al, "Syndex Executive Kernels for Fast Developments of Applications Over Heterogeneous Architectures", IEEE, pp. 1-4. 2005.*

* cited by examiner

| SERVICE NAME | TYPE | VERSION | DEPENDENCIES | PARAM. | INDEX |
|---|---|---|---|---|---|
| shoppingCart | Docker Container | 1.3 | Redis database + rabbitmg | | |
| loginService | Docker Container | 2.01 | Postgres database | | |
| | | | | | |
| | | | | | |

GUI-BASED APPLICATION TEMPLATE FOR CONTAINERIZED APPLICATION SOFTWARE DEVELOPMENT

TECHNICAL FIELD

Embodiments are generally directed to software development, and more specifically to a graphical user interface application template for application software development.

COPYRIGHT NOTICE

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

Computer applications used in large-scale networks are evolving from a monolithic architecture that provides applications for use by many users (e.g., web applications) to a microservice architecture that features many small components. This allows applications to be easily scaled by providing new or updated components without requiring rewrite or modification of the entire application. However, as the number of components or services in an application increases, the management overhead regarding fixing problems and integrating changes in the overall applications greatly increases, as well. For example, modern microservice applications may have on the order of hundreds to thousands of individual components, and managing the bug-fixes, updates, and versions of these components impose substantial time and resource drain on the development and quality assurance (QA) departments of software developers.

During the development of application software, developers and programmers fix bugs and QA engineers verify the fixes, often rejecting or opening more bugs. This can be a highly iterative process with multiple versions created by the developers until the software quality is satisfactory. In complex applications, a fix applied by a developer may need to be performed and applied to multiple components of the system, requiring the QA engineer and developer to manually configure and replace multiple parts of the system in order to reproduce issues and verify fixes. Such components may be routines, subroutines, functions, modules, libraries, and other similar parts of the application program. This fix process often requires manually replacing components or sometimes installing of a complete revised version of the program. Not only is this process time consuming, but it is also error prone in that it creates scenarios where bugs are not reproduced by developers, or the configuration verified by the QA is not the correct one.

What is needed, therefore, is a method of overcoming the error prone and slow method of present application software development processes with respect to the developer and quality assurance interaction.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve software development and deployment in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Figure 1:
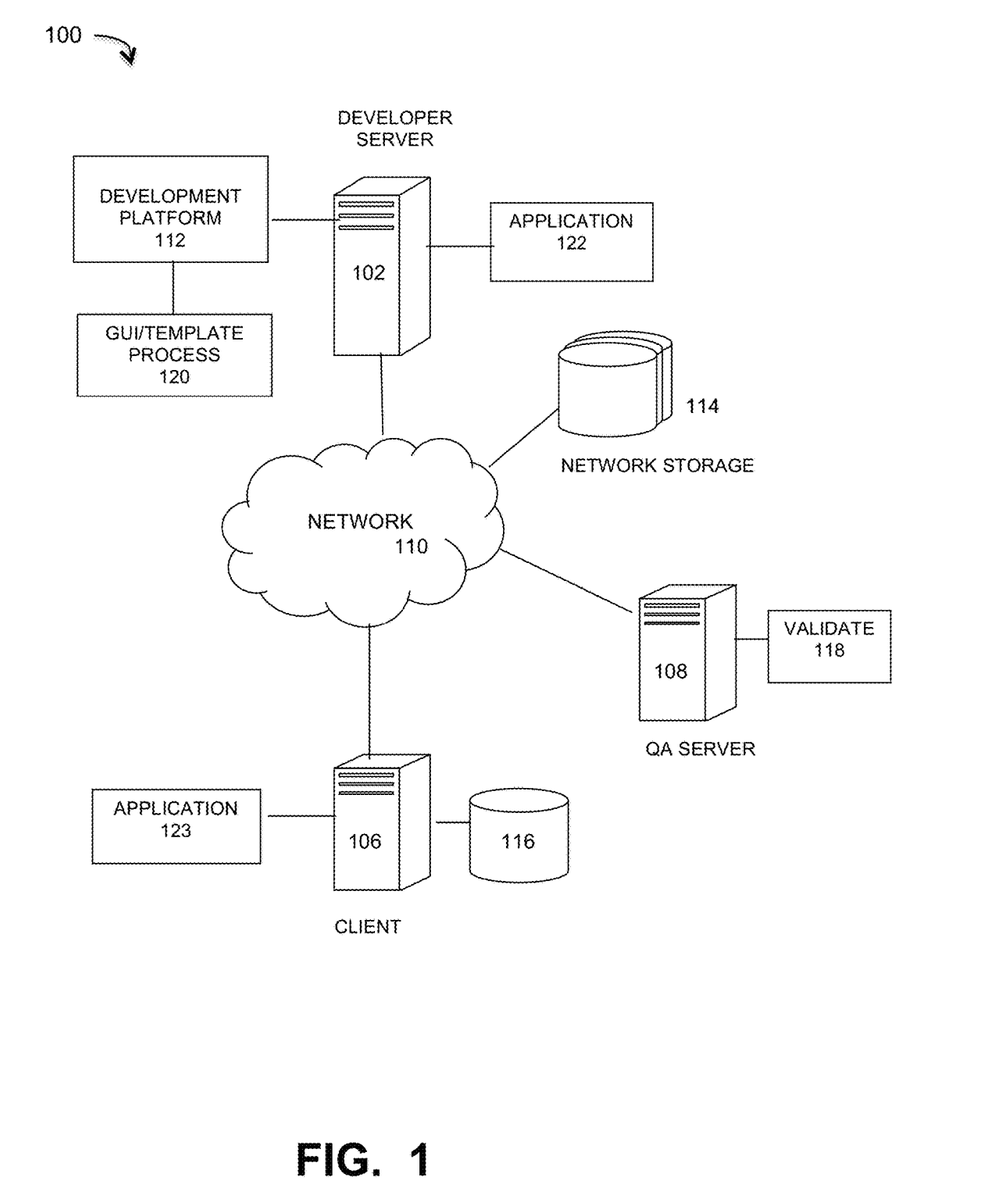
FIG. 1 is a diagram of a large-scale network implementing an application developer GUI interface, under some embodiments.

FIG. 1 illustrates a computer network system 100 that implements one or more embodiments of a GUI interface for application software developers, under some embodiments. In system 100, a developer server computer 102 is used to author or modify application software 122. Application 122 may represent any computer program that is capable of being executed on a client computer to perform certain tasks. The client may be any appropriate computer platform, such as a desktop computer, notebook/laptop, mobile device, game console, smart device, Internet-enabled appliance, and so on. Once the application is at a certain stage of development, such as an alpha or pre-release stage, it is typically sent to a QA engineer operating a QA server 108. The QA server executes certain validation tests 118 to test and validate the application program. Typically one or more bugs are detected by the QA programs, and the application software is then fixed or sent back to the developer for fixing. In complicated programs or large-scale distributed systems with many interoperating parts, this debugging process between the developer and QA personnel may be a highly iterative process involving several steps of bug detection, bug fixing, test/validation, and re-test. Data regarding the application development and debug/fix process may be stored in development logs kept in local or network storage, such as storage devices 114.

Once the application is ready to be released in a client deployment, either as a production version or trial (beta) version, it is executed on a client computer 106 in a released version 123. If any bugs are reported from clients in the field, it must be fixed or patched and these patches then go through the same developer-QA bug fix cycle.

The network server computers 102 and 108 are coupled directly or indirectly to the various client 106, storage devices 114, and other resources through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud-computing platform.

The application programs developed within system 100 may be either server-side applications, client side applications, mobile applications, and so on. For the embodiment of FIG. 1, network system 100 includes a server 102 that executes a data backup process with a functional component 120 that improves the development-QA cycle interaction by using enhanced copy data management with a purpose built graphical user interface (GUI or UI) for serving that process. This component and UI interface is configured to overcome the error prone and slow processes of present software development and provides and effective method that features automation over manual processes in a robust system that reduces human errors over current developer/QA interaction cycles.

In an embodiment, process 120 utilizes modern container techniques to provide a UI-based solution that allows developers and QA to manipulate and exchange application configurations in an efficient and robust manner. In general, containerization involves encapsulating an application in a container with its own operating environment, in contrast to launching an entire virtual machine for each application. Each application is deployed in its own container that runs directly on the server plus a single, shared instance of the operating system. For a container-based embodiment of FIG. 1, multiple isolated systems are run on a single control host and access a single kernel. The application containers hold the components such as files, environment variables and libraries necessary to run the developed application.

Application Template

Figure 2:
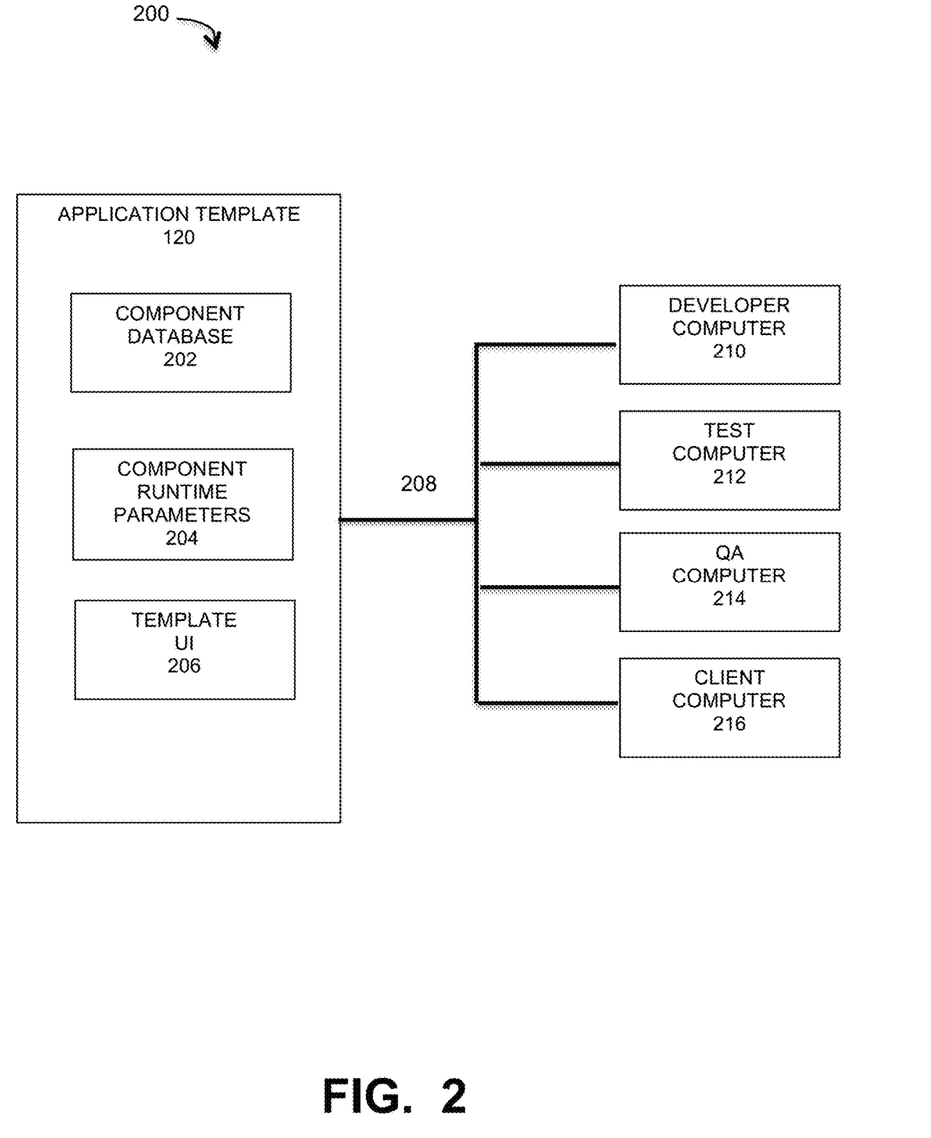
FIG. 2 illustrates functional components of a GUI-based application template process or module, under some embodiments.

FIG. 2 illustrates functional components of a GUI-based application template process or module, under some embodiments. As shown in diagram 200, the application template process 120 includes several processes or functional sub-components such as a component database 202, component runtime parameters 204, and a template UI interface 206, among other possible processes. The application template 120 is functionally coupled through network connections 208 to the resources of the developer system including other developer server computers 210, test computers 212, and QA computers 214, and other possible resources, such as even a client computer 216.

In a containerized application containing multiple microservices, there are several components each maintaining its own version. For example, a word processor application may include many subroutines, such as for text I/O, formatting, spellcheck, dictionary, drawing graphics, table entry, and so on. As the application is developed, each subroutine may go through multiple versions, in addition, the subroutines must be tested together so that it is assured that the program as a whole, functions correctly. In general, the term "service" or "microservice" denotes any functional unit or subunit of an application program that is capable of being authored independently of the others with respect to version number and validation tests, among other distinctions, but that may be dependent upon or interact with any other component in the application program.

In an embodiment, process 120 provides each deployed application with an application template that holds versions of each component in the system, including their dependencies and infrastructure services required during runtime. For each application or application microservice the process also stores the current version of the component.

Applications may be categorized by type, such as small, medium and large-scale applications. Small-scale applications may be relatively small standalone modules that do not contain many, if any submodules, and may be limited with regard to target binary size, client device type, and so on. Large-scale applications may comprise large software programs or infrastructure level applications, such as large database programs, and the like. Such large-scale applications for infrastructure services, the system will also store the configuration and version as it might be upgraded/modified as part of the fix. A medium-scale or other granularity application may be of any scale in between that of small and large. In addition, component runtime parameters and configuration are also stored so that the application can be run with the same conditions.

Figure 3:
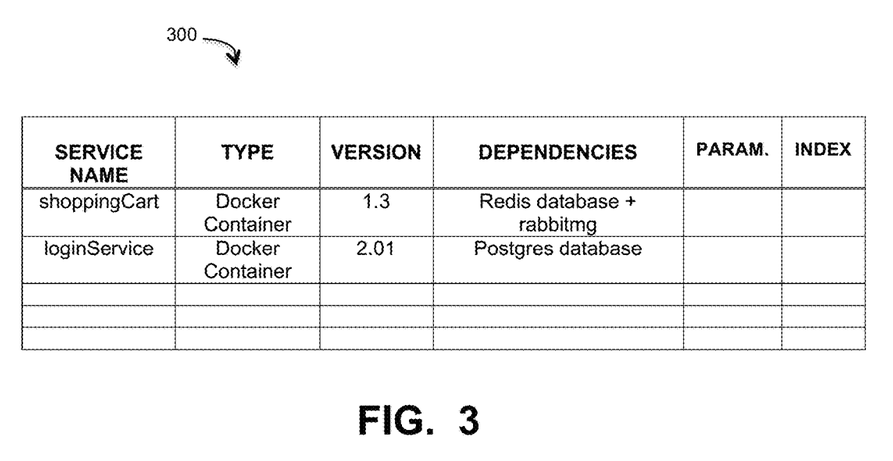
FIG. 3 illustrates a template database, under some embodiments.

In an embodiment, the template data is stored as part of a database that is used to populate and/or partially create a user interface displayed to the developer, QA, and or client personnel as appropriate. FIG. 3 illustrates a template database, under some embodiments. As shown in FIG. 3, table 300 defines an example table representing database entries for an application template, under some embodiments. Table 300 includes a number of fields for an application including the name of each relevant service (subroutine, module, etc.), type (e.g., large, medium, small-scale), and current version number for each service. The application name can be any alphanumeric name or code that uniquely identifies the entire application program. The type can be specified by an appropriate code, and the version can be a sequential number or alphanumeric code. Other data items associated with each named service includes the dependencies among the services. Dependencies can specify I/O relationships, data definitions, and other relationships between a service and any other service of the application. Other fields can be included, such as runtime parameters that may be defined for each service and/or index fields to provide additional definitions for each service, and other possible data elements. The example table of FIG. 3 shows two illustrative services—a shopping cart and a login service and some representative field definitions. FIG. 3 is provided for purposes of illustration only and many other formats and content definitions can be provided.

In an embodiment, the application template is created as part of the runtime infrastructure without need for user intervention. In this way, the application state can be automatically created without human error. The template is updated as services are added or deleted from the application, and any dependencies, parameters, etc. are updated automatically as services or application configuration is changed. The template may be stored in any appropriate shared storage location, such as networked storage 114. For the most part the application template is not very large in size, and is usually on the order of only a few KBs of data. This allows it to easily store the information in a file or as a database entry. Appropriate references can be created as needed to the stored data for other downstream processes.

Figure 4:
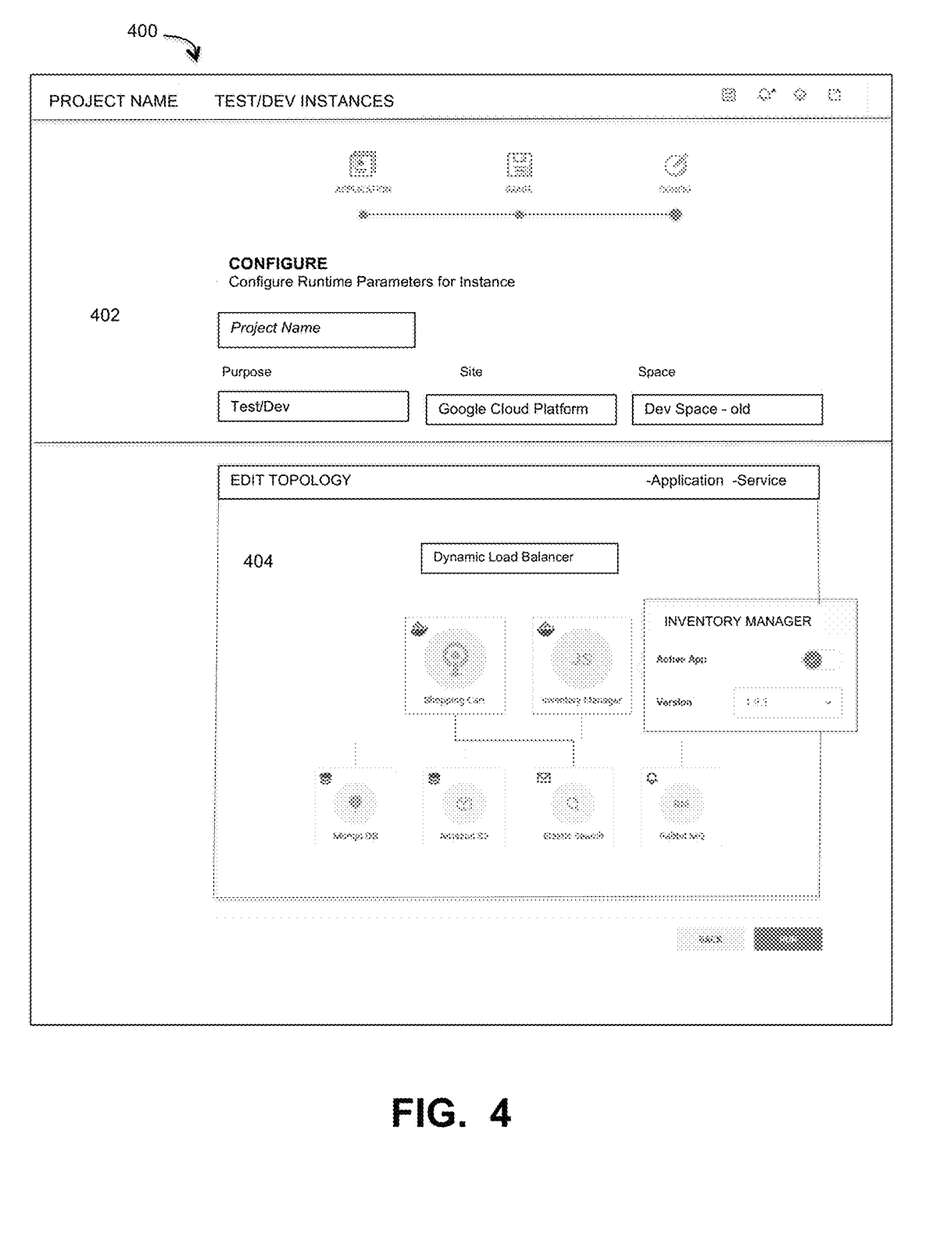
FIG. 4 illustrates an example GUI screen providing access to an application template under some embodiments.

Once the template is created and stored, it can be accessed by the different entity computers as shown in FIG. 2. With respect to using the templates, references to the stored template, both encapsulated (or containerized) or not, provide a way of communicating applications. In an embodiment, the process 120 includes a GUI interface that creates or hosts a client computer user interface that allows users (e.g., developers, QA, clients, etc.) to access and use the template. Any appropriate UI format and I/O or command interface may be used. FIG. 4 illustrates an example GUI screen providing access to an application template under some embodiments. FIG. 4 shows an example UI for running and configuring an application instance from a template. The UI 400 may include any number of display areas showing attributes related to the template being viewed, such as the template definitions and code, as well as an application map that shows the layout of the service or subroutine for the template as it fits into the actual application itself. For the example of FIG. 4, UI 400 includes a configuration window 402 that specifies or allows the user to choose items for the selected project, such as the purpose (e.g., test/development), the site (e.g., cloud), and the space, along with other possible configuration options. A topography display area 404 shows the relationship among different modules of the project in a hierarchical relationship manner. FIG. 4 is intended to be for purposes of example and illustration only, and any other format and content layout may be possible.

The user interface and project definitions allow each user to store a saved template configuration and name it. References to the stored templates can be used to create new development and test environments by enabling users to access the templates and create or modify as needed. In an embodiment, access controls may be implemented to allow certain user classes to only perform certain tasks. For example, developers may be allowed to create, modify and view; QA may be allowed to modify and view only, while clients may be allowed to view only. These are only some example action and role-based actions and assignments, and any other appropriate scheme may also be used.

The template may be accessed directly through entity computer web browsers (for a web-hosted implementation), or it may be transmitted among user such as through e-mail. The template itself or a host link may be so transmitted. The template may also be linked to a bug tracking system so that it may be used to provide data regarding found and fixed bugs.

With respect to actual application development, the template can be used to upgrade existing applications to new versions and fix existing application configuration issues. It can also be used to compare between application configurations to find differences between different configurations and deployments. The template can also be used to provide certain system-wide benefits, such as providing preconfigured demo applications, or creating catalogs of ready applications with issues, features, or other properties.

Figure 5:
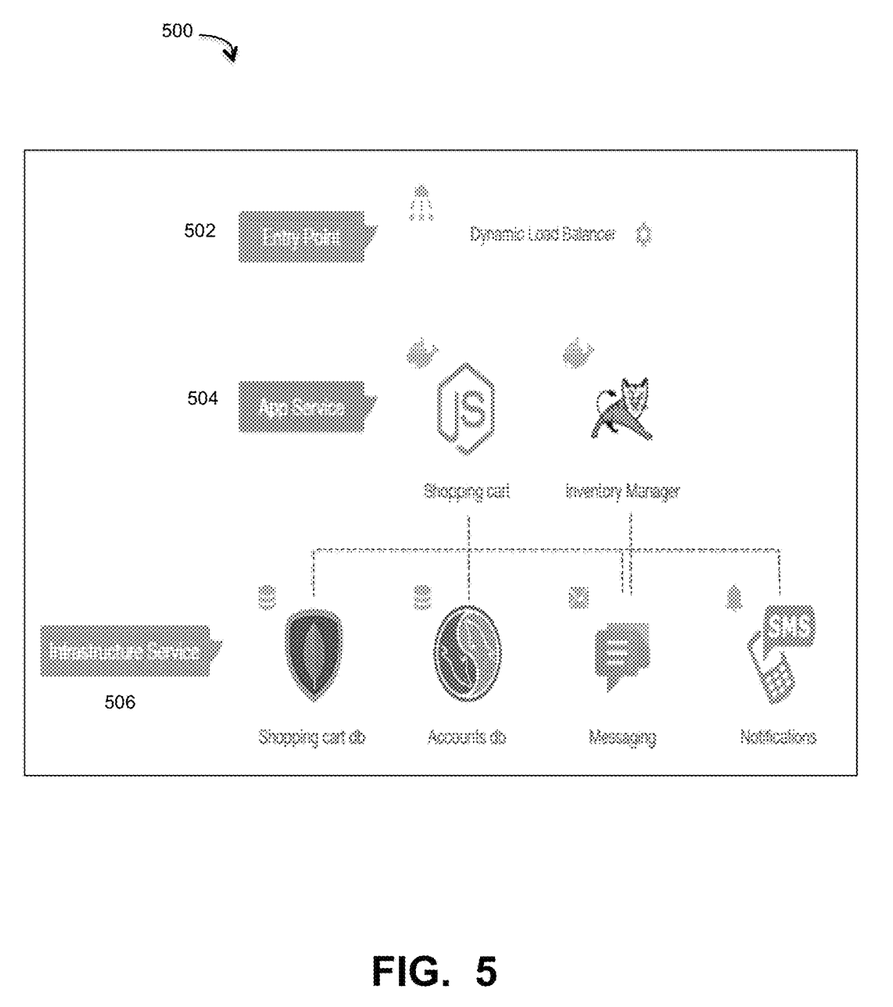
FIG. 5 illustrates a graphical representation of an application template under some embodiments.

With regard to the user interface for manipulating software versions, the uses of the references to applications can all be exposed via the UI. The UI can also be used to manipulate a template. In an embodiment, the entities (e.g., developer and QA) access the template through a defined entry point, and can manipulate the versions of the components from the user interface before deploying the application for use by clients. FIG. 5 illustrates a graphical representation of an application template under some embodiments. FIG. 5 illustrates topography of the UI showing an entry point 502 to the specific component or service (e.g., Dynamic Load Balancer), and the application 504 using the component, as well as the infrastructure service 506 using the application. In FIG. 5, the entry point 502 provides network mapping to denote which services expose what ports to the outside world of application users. The example shows a load balancer configuration. The application services 504 comprise containers containing applicative code of the application. The infrastructure services 506 are example services, such as databases, e-mail services, messaging, and so on that the application services 504 are dependent on in order to run.

The example of FIG. 5 illustrates a certain level of granularity of the elements for the application template, such as on the scale of component to application to infrastructure. It should be noted that other hierarchies or granularities might also be possible, such as subroutine to routine to program, and so on.

The entry point 502 can be accessed by an appropriate HTTP link accessible to all of the entities through their respective web browser. This access may be linked through a drop-down (or similar menu) interface that shows the latest version number of the application or service, and invokes the UI shown in FIG. 4 or FIG. 5. In this manner, the system defines a UI-driven store and share system containing application templates that defines a database storing components and services of an application, exposes the application elements to different users in the system, and provides a uniform entry point for the different users to access and manipulate the application program components.

Figure 6:
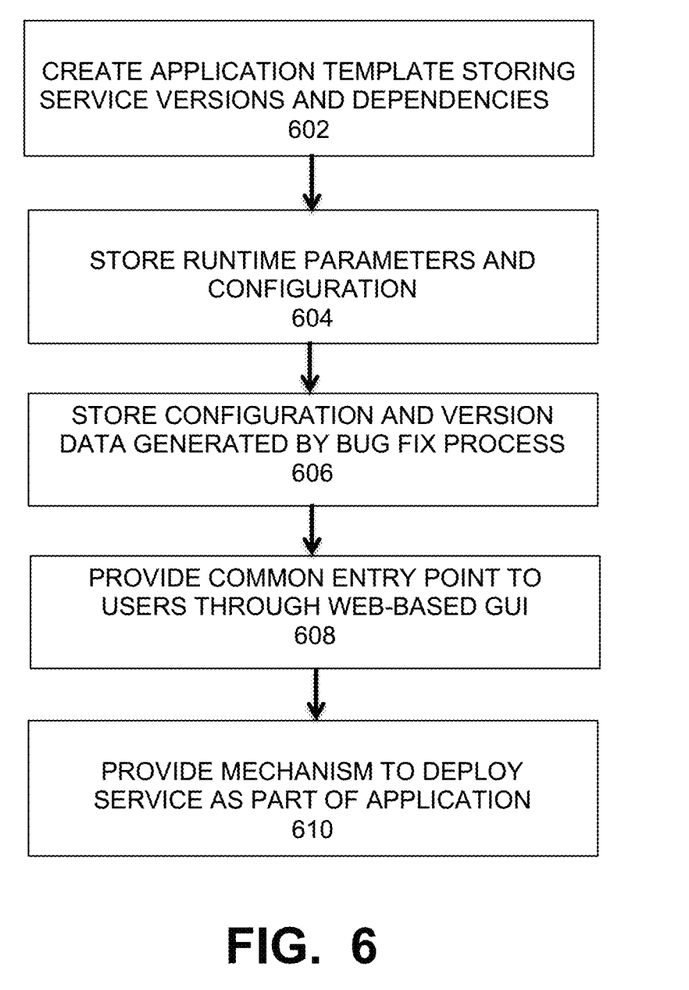
FIG. 6 is a flowchart illustrating a method of providing and using an application template under some embodiments.

FIG. 6 is a flowchart illustrating a method of providing and using an application template under some embodiments. As shown in FIG. 6, the process starts by creating an application template storing the current versions of each service (component) within the application including their dependencies to other services in the application, block 602. The template also stores runtime parameters and configuration information for the services, block 604. For certain applications, such as infrastructure services, the template can also store configuration and version data created by any bug fix or revisioning processes, block 608. The template is exposed to different entities in the overall software environment. For the embodiment of FIG. 6, this is performed by providing a common entry point to the template through a web-based GUI for each of the system entities, block 608. Access and manipulation of the template may be controlled by certain role-based access restrictions. The UI also provides a mechanism to deploy the service as part of the application, block 610.

The template may be defined as a database storing the relevant data in appropriate rows and columns and using database processing techniques for storage, sorting, updating, and so on as known by those of ordinary skill in the art.

As described herein, the application template and UI interface provide several significant benefits over present application software development methods. These include increased efficiency of the test and development process and automatic deployment of modified application templates, which greatly saves on manual configuration time. It also provides increased quality of the product, as there is less opportunity to get configurations wrong as they are saved and exchanged via an automated tool.

Figure 7:
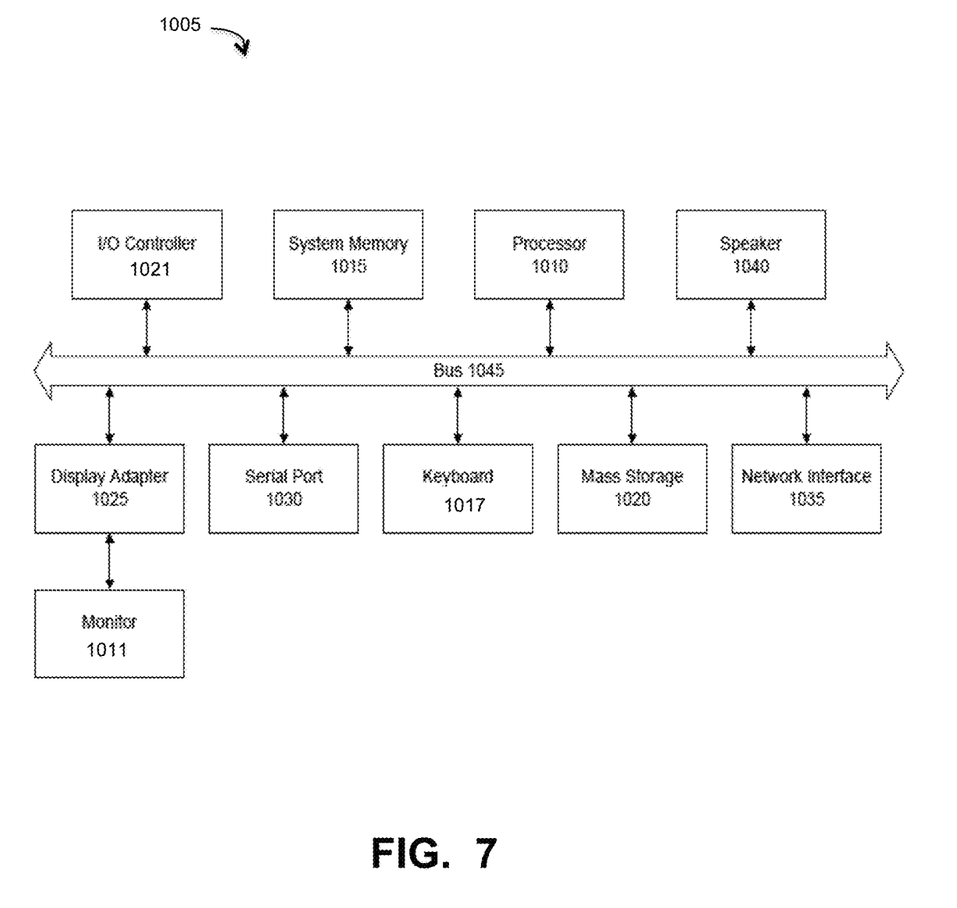
FIG. 7 shows a system block diagram of a computer system used to execute one or more software components of the present system described herein.

The network of FIG. 1 may comprise any number of individual client-server networks coupled over the Internet or similar large-scale network or portion thereof. Each node in the network(s) comprises a computing device capable of executing software code to perform the processing steps described herein. FIG. 7 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 shown in FIG. 7 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

In other implementations, the user accesses the system through either or both of native and nonnative applications. Native applications are locally installed on the particular computing system and are specific to the operating system or one or more hardware devices of that computing system, or a combination of these. These applications can be updated (e.g., periodically) via a direct internet upgrade patching mechanism or through an applications store (e.g., Apple™ iTunes and App store, Google™ Play store, and Windows™ Phone App store).

The system can run in platform-independent, nonnative applications. For example, client can access the system through a web application from one or more servers using a network connection with the server or servers and load the web application in a web browser. For example, a web application can be downloaded from an application server over the Internet by a web browser. Nonnative applications can also be obtained from other sources, such as a disk.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method executed on an application development server computer running under an operating system, comprising:
   accessing an application program comprising an application encapsulated in a container with its own operating environment running directly on the server computer with a single, shared instance of the operating system and isolated from other applications, the application comprising a plurality of services each created independently of one another;
   automatically creating, during runtime, an application template comprising a database storing, in a storage medium coupled to the server computer, a current version of each service, each service of the plurality of services having a respective version representing a state of development of the service;
   storing in the database, dependencies of the service with other services of the application;
   storing runtime parameters and configurations of the service;
   automatically updating the application template as services are added or deleted from the application; and
   providing, through a graphical user interface on respective client computers served by the server computer, a common entry point to the database for access by entities in an organization developing or using the application to improve efficiency of test and development processes and deployment of the application over manual configuration operations.

2. The method of claim 1 wherein the entities comprise a developer, a quality assurance personnel, and a client user of the application.

3. The method of claim 1 wherein the graphical user interface comprises a web page provided through a web browser to each of the entities operating a respective computer.

4. The method of claim 3 wherein the entry point provides network mapping to denote services that expose certain ports of the server computer to the entities, and accessible through a Hypertext Transport Protocol (HTTP) link for the web page.

5. The method of claim 4 wherein the application template is created as part of a runtime infrastructure of a system containing the application.

6. The method of claim 2 wherein access and manipulation of the template is controlled by role-based restrictions based on a status of an entity accessing the template, and wherein actions performed by the entity are selected from at least one of: creating, modifying, and viewing the template.

7. The method of claim 1 wherein the service is updated as part of a bug-fix process and the template is automatically updated with new version, configuration, and dependency information during runtime of the bug-fix process.

8. A system comprising a processor-based executable module configured to execute on an application development server computer running under an operating system, comprising:
   an interface accessing an application program comprising an application encapsulated in a container with its own operating environment running directly on the server computer with a single, shared instance of the operating system and isolated from other applications, the application comprising a plurality of services each created independently of one another;
   a graphical user interface component automatically creating, during runtime, an application template comprising a database storing, in a storage medium coupled to the server computer, a current version of each service, each service of the plurality of services having a respective version representing a state of development of the service;
   a database processing component storing in the database, dependencies of the service with other services of the application, and storing runtime parameters and configurations of the service;
   a process automatically updating the application template as services are added or deleted from the application; and
   a network interface component providing, through the graphical user interface on respective client computers served by the server computer, a common entry point to the database for access by entities in an organization developing or using the application to improve efficiency of test and development processes and deployment of the application over manual configuration operations.

9. The system of claim 8 wherein the entities comprise a developer, a quality assurance personnel, and a client user of the application.

10. The system of claim 8 wherein the graphical user interface comprises a web page provided through a web browser to each of the entities operating a respective computer.

11. The system of claim 10 wherein the entry point provides network mapping to denote services that expose certain ports of the server computer to the entities, and accessible through a Hypertext Transport Protocol (HTTP) link for the web page.

12. The system of claim 11 wherein the application template is created as part of a runtime infrastructure of a system containing the application.

13. The system of claim 9 wherein access and manipulation of the template is controlled by role-based restrictions based on a status of an entity accessing the template, and wherein actions performed by the entity are selected from at least one of: creating, modifying, and viewing the template.

14. The system of claim 8 wherein the service is updated as part of a bug-fix process and the template is automatically updated with new version, configuration, and dependency information during runtime of the bug-fix process.

15. A computer program product, comprising a non-transitory computer-readable medium having a computer-readable program code embodied therein, the computer-readable program code adapted to be executed by one or more processors to implement a method executed on an application development server computer running under an operating system by:
   accessing an application program comprising an application encapsulated in a container with its own operating environment running directly on the server computer with a single, shared instance of the operating system and isolated from other applications, the application comprising a plurality of services each created independently of one another;
   automatically creating, during runtime, an application template comprising a database storing, in a storage medium coupled to the server computer, a current version of each service, each service of the plurality of services having a respective version representing a state of development of the service;
   storing in the database, dependencies of the service with other services of the application;
   storing runtime parameters and configurations of the service;
   automatically updating the application template as services are added or deleted from the application; and
   providing, through a graphical user interface on respective client computers served by the server computer, a common entry point to the database for access by entities in an organization developing or using the application to improve efficiency of test and development processes and deployment of the application over manual configuration operations.

16. The computer program product of claim 15 wherein the entities comprise a developer, a quality assurance personnel, and a client user of the application and wherein the graphical user interface comprises a web page provided through a web browser to each of the entities operating a respective computer, and further wherein each service comprises a software routine executed as part of the containerized application and created independently of the other services.

17. The computer program product of claim 16 wherein the application template is created as part of a runtime infrastructure of a system containing the application, and the entry point provides network mapping to denote services that expose certain ports of the server computer to the entities, and accessible through a Hypertext Transport Protocol (HTTP) link for the web page.

18. The computer program product of claim 17 wherein access and manipulation of the template is controlled by role-based restrictions based on a status of an entity accessing the template, and wherein actions performed by the entity are selected from at least one of: creating, modifying, and viewing the template.

19. The computer program product of claim 17 wherein the service is updated as part of a bug-fix process and the template is automatically updated with new version, configuration, and dependency information during runtime of the bug-fix process.

* * * * *